July 24, 1951  E. T. GREGORIE ET AL  2,561,508
SPEEDOMETER
Filed Jan. 5, 1946  2 Sheets-Sheet 1
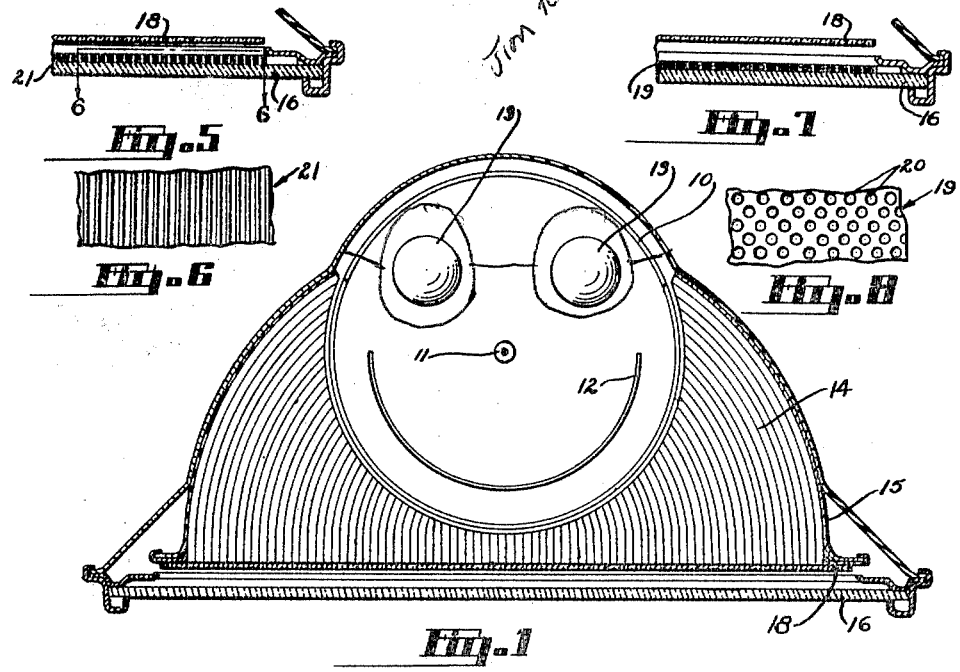
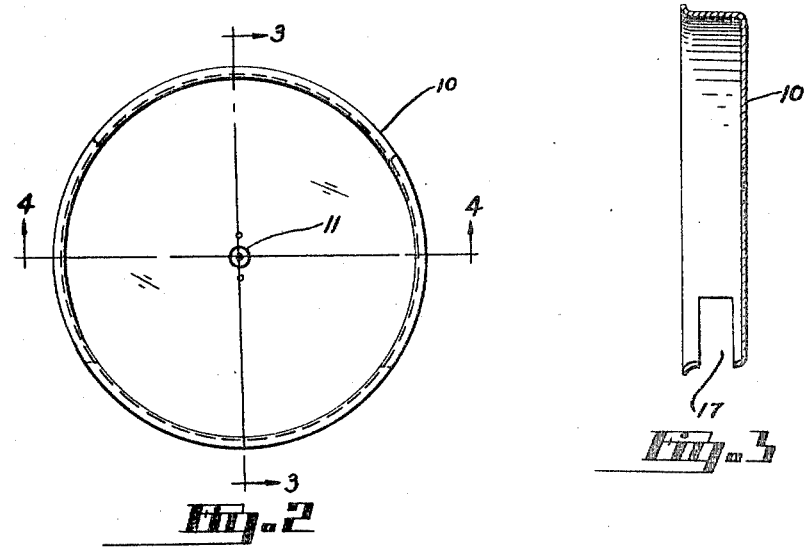
EUGENE T. GREGORIE
MILTON JOVANOVICH
INVENTORS.
BY
ATTORNEYS July 24, 1951 E. T. GREGORIE ET AL 2,561,508
SPEEDOMETER
Filed Jan. 5, 1946 2 Sheets-Sheet 2

EUGENE T. GREGORIE
MILTON JOVANOVICH
INVENTORS
BY
ATTORNEYS.

Patented July 24, 1951

2,561,508

UNITED STATES PATENT OFFICE 2,561,508

SPEEDOMETER

Eugene T. Gregorie, Grosse Ile Township, Wayne County, and Milton Jovanovich, Detroit, Mich., assignors to Ford Motor Company, Dearborn, Mich., a corporation of Delaware Application January 5, 1946, Serial No. 639,455

1 Claim. (Cl. 116—129)

This invention is concerned with a speedometer construction and more particularly with a vehicle speedometer in which a column of light is employed to give an indication of speed in the form of a column of light rather than the usual needle or other purely mechanical indicator.

An object of this invention is to provide a speedometer which is at once more decorative and easier to read than the conventional instrument in which reliance is placed upon a needle moving along a calibrated dial.

A further object of this invention is to provide a speedometer in which variations in color and/or intensity of a column of light can be used to indicate various speed ranges.

A further object of this invention is to provide a speedometer in which variations in the color, length and intensity of an indicating light column may be employed to cause the activation of a light sensitive cell. Such a light sensitive cell could thus control other operations in response to speed changes.

With these and other objects in view, the invention comprises the arrangement, construction and combination of the various parts of the mechanism described in the specification, claimed in the claim and depicted in the accompanying drawings, in which:

Figure 1 is a horizontal section through the preferred form of the speedometer.

Figure 2 is a plan view of the masking drum.

Figure 3 is a vertical section of the masking drum taken along the line 3—3 in Figure 2.

Figure 4 is a vertical section of the masking drum taken along the line 4—4 in Figure 2.

Figure 5 is a horizontal section of a portion of the dial of the speedometer showing a variation in the structure.

Figure 6 is an elevation of the same portion of the dial which is depicted in Figure 5.

Figure 7 is a horizontal section of a further variation in the dial structure.

Figure 8 is an elevation of that variation shown in Figure 7.

Figure 9:
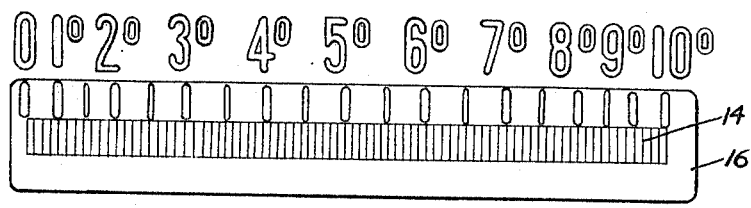
Figure 9 is a frontal view of the dial of the speedometer.

The operation of the speedometer of this invention is probably best understood from a study of Figure 1 of the drawing. In this speedometer as in the conventional instrument, the actual speed responsive mechanism consists of a hollow pivoted drum which is rotated against the torque of a hairspring. The drum torque which is opposed to the hair spring torque is produced by rotating concentrically with the drum and in close approximation therewith a permanent magnet. The speed of the permanent magnet bears, of course, a fixed relationship to the speed to be measured.

Figure 1 represents a section taken normal to the axis of the drum and at a distance above the top of the drum. In Figure 1, 10 is a masking drum secured at its center to shaft 11 which is mounted directly upon and concentric with the speed response drum mentioned in the preceding paragraph. Thus the masking drum 10 will be displaced angularly an amount proportional to the speed to be measured. Masking drum 10 is provided with a peripheral light aperture 17. The structure of masking drum 10 and the size and location of light aperture 17 is easily understood from Figures 2, 3 and 4. It is preferred that the light aperture 17 cover about 104° of the periphery but this figure is of course subject to wide variation to suit the individual design.

Mounted within masking drum 10 is light shield 12 and incandescent lights 13. These lights are wired into the ignition circuit of the vehicle. The purpose of these lights and the shield will become apparent as the description progresses.

Entirely surrounding all of the periphery of masking drum 10 which is not taken up by light aperture 17 in the "at rest" position, are a large number of narrow strips or ribbons 14 of a clear transparent plastic known to the trade as "Plexiglas" or "Lucite." Technically this material is a polymer of methyl methacrylate. This particular polymer has the property of "piping" a beam of light from one end of a tube or strip to the other. A beam of light impinging upon a cut or roughened end of such a tube or strip will for the greater part be conducted to the other end with comparatively little light loss by absorption or through the polished side walls.

As currently built, ninety-six of these strips 14 are mounted in face to face relationship and held in place by a pressed steel container 15. The ends of strips 14 are covered by a transparent colored strip 18 which serves as the actual speed indicating means. As masking drum 10 starts to rotate counterclockwise, the individual strips 14 are progressively uncovered and exposed through light aperture 17 to illumination emanating from lights 13. This light will be conducted along strips 14 and escape from the ends of these strips adjacent colored strip 18. As the angular displacement of masking drum 10 from the "at rest"

position becomes greater, a larger number of the strips 14 will be illuminated and a greater length of colored strip 18 will be lighted. Dial 16 is located in front of colored strip and is calibrated to indicate the speed in miles per hour. The lengthening of the lighted portion of strip 18 gives a continuous indication of speed and presents a thermometer-like appearance.

Light shield 12 is arranged so that all except the longest of strips 14 are protected from direct radiation from lights 13 and are exposed only to reflected rays. The purpose of this expedient is to equalize the amount of light reaching colored strip 18 from each of the strips 14. In order to obtain a flat dial surface, strips 14 necessarily differ radically in length from the end to the center of the dial. The transmission of light is therefore much easier along the central strip than those at the ends. This situation is aggravated by the fact that the central strips receive the light normal to their ends while the end strips are illuminated at a more or less acute angle. By the illustrated judicious arrangement of lights and the shield, an approximately even illumination of coloring strip 18 can be attained.

Reference to Figure 9 of the drawing will show that in the more commonly used speed range of twenty to seventy miles per hour, the speed is indicated upon an enlarged scale. This effect is obtained by making the central strips 14 with a horizontal taper and placing the thicker end adjacent the scale. By a similar expedient, any desired section of the scale can be brightened by tapering the strips 14 vertically with the wide end adjacent the light source.

Figures 5, 6, 7 and 8 represent two alternative expedients for increasing the apparent brightness of the illuminated scale. These expedients are designed to alleviate the tendency of strong sunlight to obscure the indication. Figures 5 and 6 depict a shutter-like arrangement. Here matte finished shutters 21 are placed immediately behind dial 16 and in front of colored strip 18. These shutters 21 are placed so that the openings are parallel to the line of vision of the driver and so offer little impediment to sight. However, the rays of sunlight will be deflected and absorbed by these shutters. Figures 7 and 8 show a similar expedient in which a finely perforated metal plate 19 is substituted for the shutters 21. The perforations 20 in metal plates 19 are preferably arranged with the lines joining the center oblique to the edge of the strips 14.

Figure 9 illustrates a graduated dial 16 showing the ends of strips 14. This figure shows the preferred distribution of the mileage scale across the length of the dial.

Figure 10:
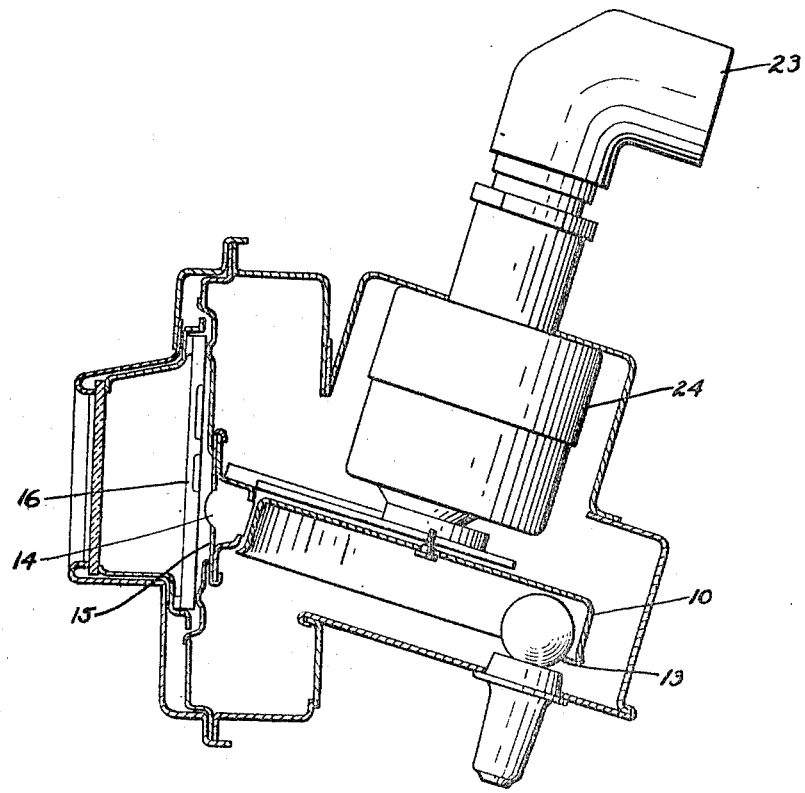
Figure 10 is a vertical section of a speedometer showing the general arrangement of the component parts.

Figure 10 is a general vertical section of a speedometer differing slightly from that shown in Figure 1 in that the drive is from the top rather than the bottom. The drive 23 is brought in at the top and terminates in speed sensitive mechanism 24. The other parts of the instrument correspond to those previously described.

The structure described is primarily intended as a speedometer, but obviously is capable of use as an instrument indicator wherever it is desired to translate a delicate mechanical movement into a visual indication.

By a suitable variation in the colors of coloring strip 18, a color indication of speed can be obtained. By placing a light sensitive cell adjacent the edges of selected strips 14, or by providing suitable branches of strips 14, a speedometer of the type described can be used as the basic control unit in a wide variety of instruments. By way of example only, such a light sensitive cell can be used to change road illumination, to change the fuel air ratio, to bias the action of the spark advancement mechanism or to assist in the operation of an automatic transmission.

Some changes may be made in the arrangement, construction and combination of the various parts of the improved device without departing from the spirit of the invention and it is intended to cover by the claim such changes as may reasonably be included within the scope thereof.

The invention claimed is:

In a vehicle speedometer, a rotatable speed responsive member the angular displacement of which is proportional to vehicle speed, a masking drum mounted concentric with the speed responsive member and connected therewith, a source of illumination within the masking drum, a light shield within the masking drum, a light aperture in the periphery of the masking drum, and a plurality of strips of a light conducting material in face to face relationship, each strip having one end adjacent the periphery of the masking drum and the other end adjacent and parallel to an indicating dial and arranged so that rotation of the masking drum first progressively and cumulatively and then progressively exposes the inner ends of the light conducting strips to illumination from the light source within the drum, said light shield being interposed between the source of illumination and at least some of the inner ends of the light conducting strips, and the length of arc of the apertured portion of the drum being less than the length of arc of the inner end portions of the light conducting material.

EUGENE T. GREGORIE.
MILTON JOVANOVICH.

REFERENCES CITED

The following references are of record in the file of this patent:

UNITED STATES PATENTS

| Number | Name | Date |
| --- | --- | --- |
| 1,771,237 | Van Reeth | July 22, 1930 |
| 1,797,772 | Hickman | Mar. 24, 1931 |
| 2,088,326 | Klopper | July 27, 1937 |
| 2,204,553 | Smola | June 18, 1940 |
| 2,309,941 | Drummond | Feb. 2, 1943 |
| 2,333,492 | Ridge | Nov. 2, 1943 |
| 2,385,254 | Bludworth | Sept. 18, 1945 |